United States Patent
Yakovleva et al.

(10) Patent No.: US 10,374,228 B2
(45) Date of Patent: **\*Aug. 6, 2019**

(54) STABILIZED LITHIUM METAL POWDER FOR LI-ION APPLICATION COMPOSITION

(71) Applicant: FMC Lithium USA Corp., Philadelphia, PA (US)

(72) Inventors: Marina Yakovleva, Gastonia, NC (US); Yuan Gao, Greenwood Village, CO (US); Kenneth Brian Fitch, Cherryville, NC (US); B. Troy Dover, Kings Mountain, NC (US); Prakash Thyaga Palepu, Gastonia, NC (US); Jian-xin Li, Edison, NJ (US); Brian Anthony Christopher Carlin, Lawrenceville, NJ (US); Yangxing Li, Belmont, NC (US)

(73) Assignee: FMC Lithium USA Corp., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,963

(22) Filed: Nov. 20, 2018

(65) Prior Publication Data

US 2019/0097221 A1    Mar. 28, 2019

Related U.S. Application Data

(63) Continuation of application No. 15/830,707, filed on Dec. 4, 2017, now Pat. No. 10,141,568, which is a
(Continued)

(51) Int. Cl.
*H01M 4/36* (2006.01)
*H01M 4/587* (2010.01)
(Continued)

(52) U.S. Cl.
CPC .......... *H01M 4/366* (2013.01); *B22F 1/0062* (2013.01); *B22F 1/02* (2013.01); *H01M 4/131* (2013.01);
(Continued)

(58) Field of Classification Search
USPC .................................................. 428/402–407
See application file for complete search history.

(56) References Cited

U.S. PATENT DOCUMENTS 3,271,196 A    9/1966 Oswin
3,506,967 A    4/1970 Lyall et al.
(Continued)

FOREIGN PATENT DOCUMENTS

CN    1290047 A    4/2001
CN    1694298 A    11/2005
(Continued)

OTHER PUBLICATIONS

U.S. Appl. No. 10/900,715, filed Jul. 28, 2004, Gao et al.
(Continued)

*Primary Examiner* — Alexandre F Ferre
(74) *Attorney, Agent, or Firm* — F. Michael Sajovec; Williams Mullen

(57) ABSTRACT

The present invention provides a lithium metal powder protected by a wax. The resulting lithium metal powder has improved stability and improved storage life.

6 Claims, 3 Drawing Sheets

Related U.S. Application Data continuation of application No. 14/604,036, filed on Jan. 23, 2015, now abandoned, which is a continuation of application No. 11/870,544, filed on Oct. 11, 2007, now abandoned.

(60) Provisional application No. 60/829,378, filed on Oct. 13, 2006.

(51) Int. Cl.
| | |
|---|---|
| B22F 1/02 | (2006.01) |
| B22F 1/00 | (2006.01) |
| H01M 4/40 | (2006.01) |
| H01M 4/133 | (2010.01) |
| H01M 4/134 | (2010.01) |
| H01M 4/38 | (2006.01) |
| H01M 4/485 | (2010.01) |
| H01M 4/62 | (2006.01) |
| H01M 4/131 | (2010.01) |
| H01M 4/1315 | (2010.01) |
| H01M 4/02 | (2006.01) |
| H01M 10/052 | (2010.01) |

(52) U.S. Cl.
CPC .......... *H01M 4/133* (2013.01); *H01M 4/134* (2013.01); *H01M 4/1315* (2013.01); *H01M 4/386* (2013.01); *H01M 4/387* (2013.01); *H01M 4/40* (2013.01); *H01M 4/485* (2013.01); *H01M 4/587* (2013.01); *H01M 4/628* (2013.01); *B22F 1/0077* (2013.01); *B22F 2998/10* (2013.01); *B22F 2999/00* (2013.01); *H01M 10/052* (2013.01); *H01M 2004/027* (2013.01)

(56) References Cited

U.S. PATENT DOCUMENTS

| | | | |
|---|---|---|---|
| 4,615,959 | A | 10/1986 | Hayashi et al. |
| 4,668,595 | A | 5/1987 | Yoshino et al. |
| 4,945,014 | A | 7/1990 | Miyabayashi et al. |
| 5,028,500 | A | 7/1991 | Fong et al. |
| 5,153,082 | A | 10/1992 | Ogino et al. |
| 5,162,176 | A | 11/1992 | Herr et al. |
| 5,286,582 | A | 2/1994 | Tahara et al. |
| 5,312,611 | A | 5/1994 | Takami et al. |
| 5,312,623 | A | 5/1994 | Plichta et al. |
| 5,543,021 | A | 8/1996 | Yazami et al. |
| 5,587,256 | A | 12/1996 | Wilson et al. |
| 5,643,665 | A | 7/1997 | Saidi |
| 5,672,446 | A | 9/1997 | Barker et al. |
| 5,707,756 | A | 1/1998 | Inoue et al. |
| 5,725,968 | A | 3/1998 | Sato et al. |
| 5,753,387 | A | 5/1998 | Takami et al. |
| 5,753,388 | A | 5/1998 | Koksbang et al. |
| 5,776,369 | A | 7/1998 | Dover et al. |
| 5,807,645 | A | 9/1998 | Takeuchi et al. |
| 5,948,569 | A | 9/1999 | Moses et al. |
| 5,951,919 | A | 9/1999 | Hwang et al. |
| 5,958,622 | A | 9/1999 | Kojima et al. |
| 5,976,403 | A | 11/1999 | Dover et al. |
| 6,156,457 | A | 12/2000 | Takami et al. |
| 6,168,885 | B1 | 1/2001 | Narang et al. |
| 6,183,911 | B1 | 2/2001 | Kweon et al. |
| 6,265,110 | B1 | 7/2001 | Rao et al. |
| 6,270,926 | B1 | 8/2001 | Yamashita et al. |
| 6,387,564 | B1 | 5/2002 | Yamashita et al. |
| 6,465,126 | B1 | 10/2002 | Jannasch et al. |
| 6,541,156 | B1 | 4/2003 | Fuse et al. |
| 6,706,447 | B2 | 3/2004 | Gao et al. |
| 7,276,314 | B2 | 10/2007 | Gao et al. |
| 2002/0119373 | A1 | 8/2002 | Gao et al. |
| 2004/0002005 | A1 | 1/2004 | Gao et al. |
| 2004/0146784 | A1 | 7/2004 | Gao et al. |
| 2005/0130043 | A1 | 6/2005 | Gao et al. |

FOREIGN PATENT DOCUMENTS

| | | |
|---|---|---|
| CN | 1918727 A | 2/2007 |
| DE | 689 10 843 | 8/1989 |
| EP | 0 328 131 B1 | 8/1989 |
| EP | 0763865 A1 | 1/1992 |
| EP | 0573266 A1 | 6/1993 |
| EP | 0601832 A1 | 12/1993 |
| EP | 0696075 A2 | 8/1995 |
| EP | 0696075 A3 | 8/1995 |
| GB | 2383465 A | 6/2003 |
| JP | 58199806 | 11/1983 |
| JP | 63-13282 | 1/1988 |
| JP | 63178449 | 7/1988 |
| JP | 4-39859 | 2/1992 |
| JP | 4-126374 | 4/1992 |
| JP | 04190555 | 7/1992 |
| JP | 5-234621 | 9/1993 |
| JP | 05234621 | 9/1993 |
| JP | 19532626 A1 | 3/1996 |
| JP | 8-505440 A | 6/1996 |
| JP | 10-117406 | 5/1998 |
| JP | 10-223259 | 8/1998 |
| JP | 10223259 | 8/1998 |
| JP | 10-270086 | 10/1998 |
| JP | 11-025975 | 1/1999 |
| JP | 11025975 | 1/1999 |
| JP | 11120993 | 4/1999 |
| JP | 2000-67853 | 3/2000 |
| JP | 2000164210 A | 6/2000 |
| JP | 2001229977 | 8/2001 |
| JP | 2005317551 | 11/2005 |
| JP | 2010538424 A | 12/2010 |
| KR | 20010037101 | 5/2001 |
| KR | 102002003742 A | 1/2002 |
| WO | 94/19100 A1 | 9/1994 |
| WO | WO 00/13249 | 3/2000 |
| WO | 200221632 A1 | 3/2002 |
| WO | 2003035505 A1 | 4/2003 |
| WO | 2007005983 A1 | 1/2007 |
| WO | 2008143854 A1 | 11/2008 |
| WO | 2009029270 A1 | 3/2009 |

OTHER PUBLICATIONS

U.S. Appl. No. 10/324,611, filed Dec. 20, 2002, Gao et al.

Notification of Transmittal of the International Search Report and the Written Opinion ofthe International Searching Authority, or the Declaration, PCT/US2004/24502, dated Dec. 7, 2004.

Notice of Submit Response to the Examination Report corresponding to Korean Patent Application No. 10-2002-0023709 dated Sep. 28, 2006.

European Search Report corresponding to Great Britain application No. GB0209424.1; dated Jul. 11, 2002.

Search and Examination Report corresponding to Great Britain Application No. GB0703754.2 dated Jun. 22, 2007.

Huang et al. "Electrochemical characteristics of $Sn_{1-x}Si_2O_2$ as ande for lithium-ion batteries", *J. of Power Sources* 81-82:362-367 (1999).

"WordNet Search", WordNet. Mar. 20, 2008 http://wordnet.princeton.edu.

International Programme on Chemical Safety, n-Hexane Data Sheet 0279, Apr. 2000.

"Microencapsulation of Lithium", *U.S. Dept. of Commerce National Technical Information Services* (Dec. 31, 1985) 68 pages.

Zhang, et al. "Formation of organic coating on ultrafine silver particles using a gas-phase process," Aerosol Science 35, (2004) 457-471) (Year: 2004).

Mujumdar, et al. "Improvement of humidity resistance of magnesium powder using dry particle coating," Powder Technology 140 (2004) 86-97 (Year: 2004).

(56) References Cited

OTHER PUBLICATIONS

Office Action corresponding to Japanese Patent Application No. 2014-101264; dated Nov. 13, 2015.
Japanese Office Action corresponding to Japanese Patent Application No. 2014-101264; dated Mar. 3, 2015; Foreign Text, 2 pages, English translation thereof, 2 pages.
Hong, et al., "Surface characterization of emulsified lithium powder electrode", Electrochimica Acta 50:535-539 (2004).
Kwon, et al., "Characteristics of a lithium-polymer battery based on a lithium powder anode", J. of Power Sources 93:145-150 (2001).
Marshall, Mary, "Microencapsulation of lithium" DTIC-TR: Defense Technical Information Center ADA 162987:1-30 (1985).
Notification of Transmittal of the International Search Report and the Written Opinion of the International Searching Authority, or the Declaration corresponding to PCT/US2007/021894 dated Mar. 11, 2008.
Supplementary Search and Examination Report corresponding to Great Britain Application No. 04779517 dated Feb. 20, 2009.
Canadian Office Action corresponding to Canadian Application No. 2384494 dated Mar. 10, 2009.
Search Report corresponding to French Application No. 0205144 dated May 15, 2009.
Examination Report corresponding to European Patent Application No. 08828815.4 dated Dec. 30, 2010.
Song, et al., "Surface Control of Lithium Powder by Use of a SET", J Korean Phys. Soc. 54(3):1136-1140 (2009).
Examination Report corresponding to European Patent Application No. 1019834.9 dated Feb. 11, 2011.
Chinese Office Action corresponding to Chinese Application No. 200780037907.3 dated Jan. 19, 2011.
Examination Report corresponding to British Application No. 0901850.8 dated Feb. 11, 2011.
Examination Report corresponding to British Application No. 0901850.8 dated Jun. 22, 2011.
Examination Report corresponding to British Application No. 1109888.6 dated Jun. 22, 2011.
Foster, et al., "Nanocomposites of Sn and Li2O Formed from the Chemical Reduction of SnO as Negative Electrode Material for Lithium-Ion Batteries," Electrochemical and Solid-State Letters 3(5):203-204 (2000).
Non-Final Rejection corresponding to Korean Application No. 10-2006-7021068 dated Sep. 19, 2011.
"Metal Lithium", Batter 3:20 (1983).
Chinese Office Action corresponding to Chinese Application No. 200780037907.3 dated Sep. 26, 2001.
Partial European Search Report corresponding to European Application No. 10192630.1 dated Oct. 5, 2011.
First Chinese Office Action corresponding to Chinese Application No. 200880104518.2 dated May 3, 2012.
First Canadian Office Action corresponding to Canadian Application No. 2,613,485 dated May 24, 2012.
First Japanese Office Action corresponding to Japanese Application No. 2008-520370 dated Jun. 12, 2012.
Examination Report corresponding to European Application No. 10192630.1 dated Feb. 4, 2013.
Office Action corresponding to Japanese Application No. 2009-532448 dated Apr. 2, 2013.
Office Action corresponding to Canadian Application No. 2,613,485 dated May 2, 2013.
First Office Action corresponding to Chinese Application No. 201110154403.8 dated Jun. 25, 2013.
Notice of Non-Final Rejection corresponding to Korean Application No. 10-2009-7005901 dated Feb. 26, 2014.
Second Office Action corresponding to Chinese Application No. 201210074382.3 dated May 26, 2014.
Third Office Action corresponding to Chinese Application No. 200780037907.3 dated Dec. 31, 2011.

STABILIZED LITHIUM METAL POWDER FOR LI-ION APPLICATION COMPOSITION

CROSS-REFERENCE TO RELATED APPLICATION

This application claims priority to U.S. Pat. No. 10,141,568, filed Dec. 4, 2017, which is a continuation of Ser. No. 14/604,036, filed Jan. 23, 2015, which is a continuation of Ser. No. 11/870,544, filed Oct. 11, 2007, that claims the benefit of U.S. provisional application No. 60/829,378, filed Oct. 13, 2006, the disclosure of which are incorporated by reference in their entireties.

FIELD OF INVENTION

The present invention relates to stabilized lithium metal powder ("SLMP") having better stability and a longer storage life. Such improved SLMP can be used in a wide variety of applications including organo-metal and polymer synthesis, rechargeable lithium batteries, and rechargeable lithium ion batteries.

BACKGROUND OF THE INVENTION

The high surface area of lithium metal can be a deterrent for its use in a variety of applications because of its pyrophoric nature. It is known to stabilize lithium metal powder by passivating the metal powder surface with $CO_2$ such as described in U.S. Pat. Nos. 5,567,474, 5,776,369, and 5,976,403, the disclosures of which are incorporated herein in their entireties by reference. The $CO_2$-passivated lithium metal powder, however, can be used only in air with low moisture levels for a limited period of time before the lithium metal content decays because of the reaction of the lithium metal and air. Thus there remains a need for stable lithium metal with an improved storage life.

SUMMARY OF THE INVENTION

The present invention provides a lithium metal powder protected by a wax. A continuous wax layer provides improved protection such as compared to, for example, $CO_2$ passivation. The resulting lithium metal powder has improved stability and improved storage life. Furthermore, the wax-protected lithium metal powder exhibits better stability in N-methyl-2-pyrrolidone (NMP), which is widely used as a solvent in the electrode fabrication process in the rechargeable lithium-ion battery industry. Similarly, the wax-protected lithium metal powder of the invention exhibits better stability in gamma-butyrolactone (GBL).

DETAILED DESCRIPTION OF THE INVENTION

Figure 1:
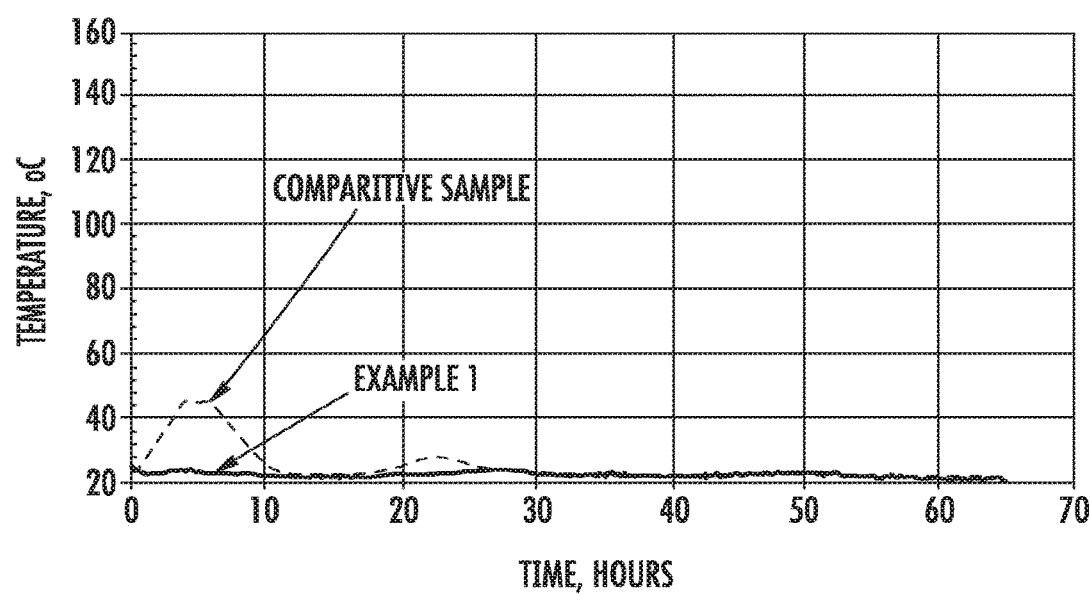
FIG. 1 is a stability comparison of the wax-coated lithium metal powder of Example 1 and a $CO_2$-stabilized lithium metal powder in dry NMP.

In the drawings and the following detailed description, preferred embodiments are described in detail to enable practice of the invention. Although the invention is described with reference to these specific embodiments, it will be understood that the invention is not limited to these embodiments. But to the contrary, the invention includes numerous alternatives, modifications and equivalents as will become apparent from consideration of the following detailed description and accompanying drawing.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with the present invention, lithium dispersions are prepared by heating the lithium metal powder in a hydrocarbon oil to a temperature above its melting point, subjecting the lithium metal powder to conditions sufficient to disperse the molten lithium (e.g., agitating or stirring vigorously), and contacting the dispersed lithium metal powder with a wax at a temperature that is between this temperature and the melting point of the wax. Other alkali metals such as sodium and potassium can be coated according to the present invention.

A variety of hydrocarbon oils may be used in the present invention. The term hydrocarbon oil, as used herein, includes various oily liquids consisting chiefly or wholly of mixtures of hydrocarbons and includes mineral oils, i.e., liquid products of mineral origin having viscosity limits recognized for oils and hence includes but is not limited to petroleum, shale oils, paraffin oils and the like. There are many manufacturers of these useful hydrocarbon oils. Among these useful hydrocarbon oils are highly refined oils, such as, Peneteck manufactured by Penreco Division of Pennzoil Products Inc., which has a viscosity in the range of 43-59 pascal-sec at 100° F. and a flash point of 265° F., Parol 100, which has a viscosity of 213-236 pascal-sec at 100° F. and a flash point of 360° F. (available from Penreco, Div. of Pennzoil Products), and Carnation white oil (viscosity=133-165 pascal-sec at 100° F.) made by Sonneborn Div. of Witco. Even certain purified hydrocarbon solvents which boil in a range encompassing the melting point of lithium or sodium metal may be used, such as UNOCAL's 140 Solvent. In addition, unrefined oils, such as Unocal's 460 Solvent and Hydrocarbon Seal oil and Exxon's Telura 401 and Telura 407 may also be used. The selection of a hydrocarbon oil will be within the skill of one in the art.

Suitable waxes can be natural wax such as 12-hydroxystearic acid, synthetic wax such as low molecular weight polyethylene, petroleum waxes such as paraffin wax, and microcrystalline waxes. The wax can be introduced to contact the lithium droplets during the dispersion, or at a lower temperature after the lithium dispersion has cooled. It is understood that combinations of different types of waxes with different chemical compositions, molecular weights, melting points and hardness could be used to achieve specific coating characteristics for particular applications. For example, degree of stickiness could be controlled to allow introduction of the SLMP using a "transfer release paper" concept, wherein a certain degree of stickiness is required.

Furthermore, it is beneficial to combine the wax or wax mixtures of the invention with other inorganic coatings, for example, $Li_2CO_3$, LiF, $Li_3PO_4$, $SiO_2$, $Li_4SiO_4$, $LiA_{1O2}$, $Li_2TiO_3$, $LiNbO_3$ and the like, to improve both air stability and polar solvent stability that would allow both safer handling and possibility of using commonly used polar solvents that dissolve commonly used polymer binders. It is recognized that most waxes are soluble in non-polar solvents at elevated temperatures and solubility at room temperature is above 0.5%. For example, wax is soluble in NMP at room temperature at about 0.1% level.

Suitable waxes described above could produce two types of coatings on lithium particles: first type representing physical or adhesive type where non-polar waxes are used and a second type, representing chemically bonded coatings where waxes with functional groups, having both hydrophobic and hydrophilic features, are used. The coating thickness could vary in the range of about 20 nm to about 200 nm.

By altering the process parameters and the order of the reagents addition to the lithium dispersion or lithium dry powder, the wax-coated lithium metal powder of the invention can have distinct surface properties. For example, waxes could be introduced at or below melting point of lithium followed by the addition of other dispersants above the melting point of lithium, and, therefore, the wax serves as dispersant/coating reagents. Other suitable dispersants include oleic acid, linoleic acid, sodium oleate, lithium oleate, linseed oil, $CO_2$, $N_2$, $NH_3$, telura oil, stearic acid, oxalic acid, tanic acid, CO, and other waxes. Waxes or wax mixtures could be introduced above the melting point of lithium before or after other dispersants and coating reagents additions, for example the reagents that result in formation of the coatings such as $Li_2CO_3$, LiF, $Li_3PO_4$, $SiO_2$, $Li_4SiO_4$, $LiA_1O_2$, $Li_2TiO_3$, and LiNbO3, and the like, to enhance the chemical bonding and uniformity of protecting layer by changing the reaction interfaces. The cooling profile could be used to control degree of crystallinity and obtain samples with pre-determined degree of stickiness.

Alternatively, stabilized lithium metal powder could be dispersed into the melted non-polar paraffin-like waxes or a mixture of waxes, and poured into the candle type mold for crystallization and the concentration of lithium powder could be calculated as a function of length or volume. Consequently, a piece of a "candle" could serve as a lithium carrier and used for organo-metallic and or polymer syntheses; the inert wax could be extracted with a solvent or allowed to crystallize out and filtered out upon reaction completion.

In another embodiment, stabilized lithium metal powder could be dispersed into the melted non-polar paraffin-like waxes or a mixture of waxes with mineral oil to form a lithium powder containing slurry or paste that could be used in a caulk-gun like apparatus for lithium powder delivery.

The process produces lithium dispersions having metal particle sizes in the range of 10 to 500 microns. Moreover, the tendency of the lithium particles to float to the top of the slurry is obviated by practice of the present invention. It is recognized that one skilled in the art will be able to choose the appropriate particle size depending on the intended use of the lithium dispersion. On cooling, the resulting lithium dispersions are readily filtered to remove the bulk of the dispersant hydrocarbon oil and the metal can then be washed with a solvent such as hexane to remove residual oil, after which, the metal powder can be dried. The hydrocarbon oil filtrate is clear and colorless and may be recycled, without further treatment, to the metal dispersion process. This is in contrast to the prior art processes which require clay column purification of the oil before reuse. The dried metal powders are unexpectedly stable to ambient atmosphere allowing their safe transfer in such atmospheres from one container to another.

Lithium metal used with various embodiments of the present invention may be provided as lithium powder. The lithium powder may be treated or otherwise conditioned for stability during transportation. For instance, dry lithium powder may be formed in the presence of carbon dioxide as conventionally known. It may be packaged under an inert atmosphere such as argon. The dry lithium powder may be used with the various embodiments of the present invention. Alternatively, the lithium powder may be formed in a suspension, such as in a suspension of mineral oil solution or other solvents. Formation of lithium powder in a solvent suspension may facilitate the production of smaller lithium metal particles, for example, wherein 100 percent of particles are less than 100 micron. In some embodiments of the present invention, a lithium powder may be formed in a solvent that may be used with various embodiments of the present invention. The lithium metal powder formed in the solvent may be transported in the solvent. Further, the lithium metal powder and solvent mixture may be used with embodiments of the present invention, wherein the step of drying SLMP is eliminated. This may decrease production costs and allow the use of smaller or finer lithium metal powder particles with the embodiments of the present invention.

Alternatively the stabilized lithium metal powder can be produced by spraying the molten metal through an atomizer nozzle, and the waxing step can take place after the powder has been collected. For example, lithium powder could be collected into lithium compatible solvent containing dry wax or pre-dissolved wax and the mixture brought to or above the temperature of the clear point of wax in the solvent, and in one embodiment above the melting point of lithium. The solvent can be stripped away, using rotary evaporator, as an example, causing wax to crystallize onto the lithium particles. Solvents used with embodiments of the invention must also be non-reactive with the lithium metal and the binder polymers (binders could be soluble in the solvents compatible with lithium) at the temperatures used in the anode production process. Preferably, a solvent or co-solvent possesses sufficient volatility to readily evaporate from a slurry to promote the drying of a slurry applied to a current collector. For example, solvents may include acyclic hydrocarbons and cyclic hydrocarbons including NMP, GBL, n-hexane, n-heptane, cyclohexane, and the like, aromatic hydrocarbons, such as toluene, xylene, isopropylbenzene (cumene), and the like symmetrical, unsymmetrical, and cyclic ethers, including di-n-butyl ether, methyl t-butyl ether, and the like.

In one embodiment, the lithium metal powder protected with wax coating enables the use of dry NMP solvent.

The stabilized lithium metal powder can be used in a secondary battery such as described in U.S. Pat. No. 6,706,447 B2, the disclosure of which is incorporated by reference in its entirety. A typical secondary battery comprises a positive electrode or cathode, a negative electrode or anode, a separator for separating the positive electrode and the negative electrode, and an electrolyte in electrochemical communication with the positive electrode and the negative electrode. The secondary battery also includes a current collector that is in electrical contact with the cathode and a current collector that is in electrical contact with the anode. The current collectors are in electrical contact with one another through an external circuit. The secondary battery can have any construction known in the art such as a "jelly roll" or stacked construction.

The cathode is formed of an active material, which is typically combined with a carbonaceous material and a binder polymer. The active material used in the cathode is preferably a material that can be lithiated at a useful voltage (e.g., 2.0 to 5.0 V versus lithium). Preferably, non-lithiated materials such as $MnO_2$, $V_2O_5$ or $MoS_2$, certain transition metal phosphates, certain transition metal fluorides, or mixtures thereof, can be used as the active material. However, lithiated materials such as $LiMn_2O_4$ that can be further lithiated can also be used. The non-lithiated active materials are selected because they generally have higher specific capacities, better safety, lower cost and broader choice than the lithiated active materials in this construction and thus can provide increased power over secondary batteries that use only lithiated active materials. Furthermore, because the anode includes lithium as discussed below, it is not necessary that the cathode includes a lithiated material for the secondary battery to operate. The amount of active material provided in the cathode is preferably sufficient to accept the removable lithium metal present in the anode.

The anode is formed of a host material capable of absorbing and desorbing lithium in an electrochemical system with the stabilized lithium metal powder dispersed in the host material. For example, the lithium present in the anode can intercalate in, alloy with or be absorbed by the host material when the battery (and particularly the anode) is recharged. The host material includes materials capable of absorbing and desorbing lithium in an electrochemical system such as carbonaceous materials; materials containing Si, Sn, tin and silicon oxides or composite tin and or silicon alloys or intermetallics; transition metal oxides such as cobalt oxide; lithium metal nitrides such as $Li_{3-x}Co_xN$ where $0<x<0.5$, and lithium metal oxides such as $Li_4Ti_5O_{12}$.

An alternative use of the stabilized lithium metal powder is in the preparation of organo lithium products in good yields. The thin wax layer is believed to not significantly retard reactivity but does protect the metal from reaction with ambient atmosphere.

The following examples are merely illustrative of the invention, and are not limiting thereon.

EXAMPLES

Comparative Example 1

Battery grade lithium metal 405 grams was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was then assembled and 1041.4 g of Peneteck™ oil (Penreco, Division of the Penzoil Products Company) was added. The reactor was then heated to about 200° C. and gentle stirring was maintained in the range of 250 rpm to 800 rpm to ensure all metal was molten, argon flow was maintained throughout the heating step. Then the mixture was stirred at high speed (up to 10,000 rpm) for 2 minutes. Oleic acid, 8.1 g was charged into the reactor and high speed stirring continued for another 3 minutes followed by the 5.1 g $CO_2$ addition. Then the high speed stirring was stopped, heating mantles removed and dispersion was allowed to cool to about 50° C. and transferred to the storage bottles. Further, lithium dispersion was filtered and washed three times with hexane and once with n-pentane in an enclosed, sintered glass filter funnel to remove the hydrocarbon oil medium while under argon flow. The funnel was heated with a heat gun to remove traces of the solvents and the resulting free-flowing powder was transferred to a tightly capped storage bottles.

Example 1

Lithium dispersion in oil, 55.72 grams, (11.275%) containing 6.28 grams of lithium with a medium particle size of 58 micron was charged into 120 ml hastelloy can equipped with a 1" Teflon coated stir bar. The solution was heated to 75° C. and 0.63 grams of Luwax A (BASF) in a form of 10% solution in p-xylene (Aldrich) pre-dissolved at 72° C. was added to the lithium dispersion. This mixture was continuously stirred at 200 rpm for 22 hours. Sample was allowed to cool to the room temperature and transferred to the storage bottle. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

Figure 2:
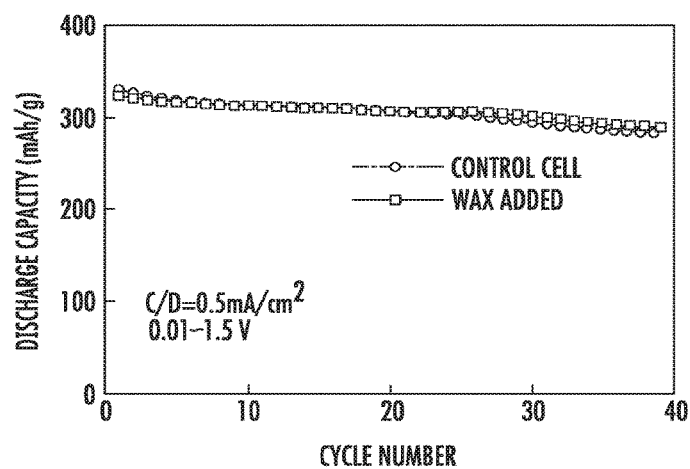
FIG. 2 is a comparison of the cycle performance of graphite electrode with wax as an additive and without wax additive.

FIG. 1 shows that no exothermic effects were observed when Example 1 was mixed at room temperature in dry NMP (<100 ppm $H_2O$). Moreover, unlike sample described in Comparative Example 1 that had no metallic lithium left after four days of exposure to dry NMP solvent, 54 percent metallic lithium was still present in Example 1. Furthermore, unlike sample described in Comparative Example 1, wax-coated lithium powder is even stable with NMP with the amount of moisture of 0.6 percent. FIG. 2 illustrates that when 1 wt % wax is introduced into the battery, (addition is calculated based on a fully lithiated carbon using 10% wax-coated SLMP) there are no adverse effects. Half cells of Li/Carbon were tested using Arbin battery cycler BT-2043. The cells were cycled at 0.50 mA/cm$^2$ with a potential window of 0.01~1.5 V.

Figure 3:
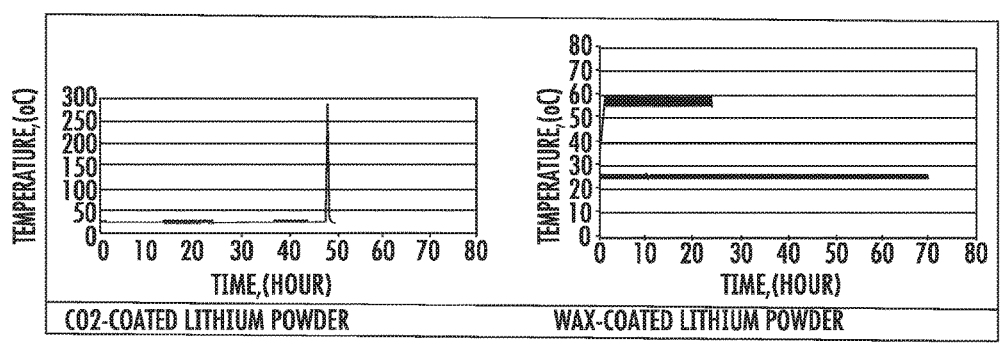
FIG. 3 is a side-by-side comparison of ARSST stability test temperature profiles for the wax-coated lithium metal powder and of $CO_2$-coated lithium metal powder in 0.6 percent water-doped NMP.
Figure 4:
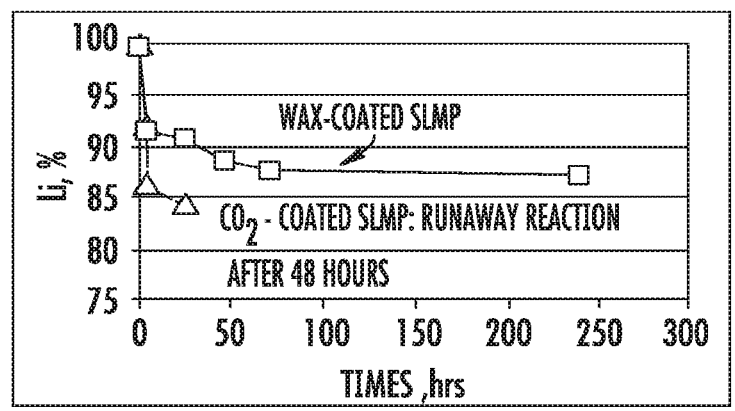
FIG. 4 is a stability comparison of Example 1 and $CO_2$-stabilized lithium metal powder in 0.6 percent water-doped NMP.

FIG. 3 shows an ARSST (advanced reactive screening system tool) calorimeter test where samples were exposed to the 0.6 percent water doped NMP under continuous stirring and three days isothermal hold at room temperature was followed by the 2 days isothermal hold at 55° C. Runaway reaction was observed for the $CO_2$-coated lithium powder at about 48 hours of hold at room temperature while no exothermic effect was observed for the wax-coated lithium metal powder of Example 1. Upon completion of these types of tests, the lithium metallic concentration for the wax-coated samples is at least 40 percent. FIG. 4 shows the metallic lithium concentration measured for the wax-coated sample followed by their exposure to the 0.6 percent water doped NMP over the period of 10 days at room temperature.

Figure 5:
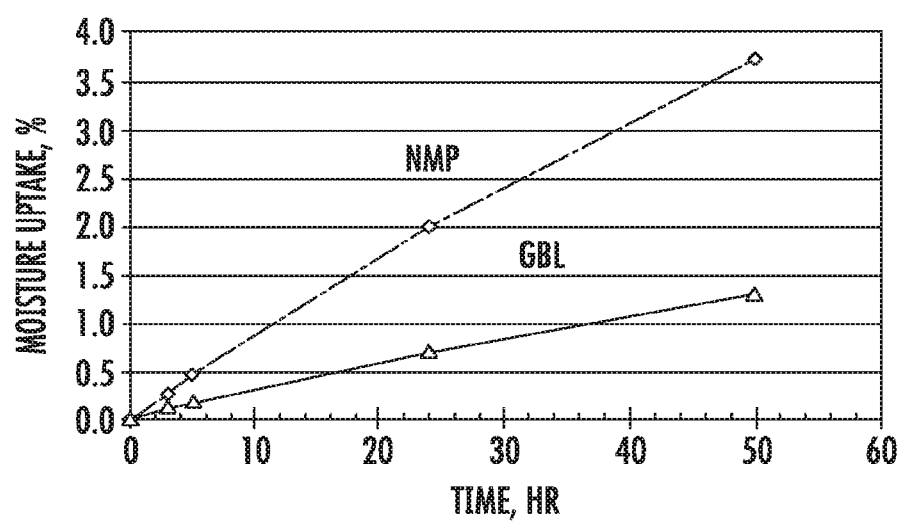
FIG. 5 is an accelerated hygroscopisity tested conducted at 25° C. and 75 percent relative humidity for NMP and GBL.

Solvent hygroscopicity causes quality and performance issues for the Li-ion batteries (for example, high moisture content might cause binder polymer to re-crystallize, thus reducing its binding properties, thus causing electrode film to crack, delaminate, thus causing failure of the battery). FIG. 5 shows accelerated hygroscopicity test results conducted at 25° C. and 75 percent relative humidity. For example, while NMP absorbs ~0.6 percent of moisture within 7 hours of exposure, GBL absorbs only 0.23 percent of moisture. This shows that the wax-coated lithium metal powder is even more stable in GBL.

Example 2

Lithium dispersion in oil, 780 g, (32.1%) that contained 250 g of lithium with a medium particle size of 63 micron was charged under constant flow of dry argon at room temperature to a 5 liter three neck glass flask reactor fitted with a stirring shaft connected to a fixed high speed stirrer motor. The reactor was equipped with bottom heating mantles. The reactor was then heated to about 75° C. and gentle stirring was maintained to ensure uniform distribution and heat transfer. 25 g of Luwax A (BASF) in a form of a 10% solution pre-dissolved in p-xylene at 72° C. was charged into the reactor and stirring continued for another 8 hours. The solution was then cooled slowly and kept at room temperature while being further stirred for 14 hrs and then transferred to the storage bottles. Further, lithium dispersion was filtered and washed three times with hexane in an enclosed, sintered glass filter funnel and twice with n-pentane to remove the hydrocarbon oil medium. The funnel was heated with a heat gun to remove traces of the solvents and the resulting free-flowing powder was transferred to a tightly capped storage bottles.

A pyrophoricity test (Method 1050 of DOT regulations for the transport of spontaneously combustible materials, Code of Federal Regulations part 173, Appendix E) performed on this material showed it to be non-pyrophoric.

Example 3

Lithium dispersion in mineral oil 21.45 grams (27.5%) that contained 5.90 g of lithium and had medium particle size of 63 microns and 0.62 g Luwax A powder were charged under constant flow of dry argon at room temperature to a 125 ml glass flask reactor with a magnetic stirrer bar controlled by super magnetic stirrer. The reactor was equipped with bottom heating mantle. The reactor was then heated to the temperature range of 90° C. to 100° C. and stirring was maintained at ~400 rpm to ensure uniform distribution and heat transfer for a period of about 1 hour followed by a natural cooling.

Example 4

Lithium dispersion in mineral oil 21.56 grams (27.5%) that contained 5.93 g of lithium and had medium particle size of 63 microns and 0.61 g Luwax A powder were charged under constant flow of dry argon at room temperature to a 125 ml glass flask reactor with a magnetic stirrer bar controlled by super magnetic stirrer. Gentle stirring was maintained ~50 rpm to ensure uniform distribution and heat transfer before temperature was increased to 90° C. The reactor was equipped. with bottom heating mantle. The reactor was then heated to the temperature range of 90° C. to 100° C. and then the stirring was increased to ~200 rpm, and the mixture was kept under stirring for about 15 minutes. Then, the heating mantle was taken off and the reactor was allowed to cool naturally.

Example 5

Lithium dispersion in mineral oil, 21.72 grams (27.5%) that contained 5.97 g of lithium and had medium particle size of 63 microns was charged under constant flow of dry argon at room temperature to a 125 ml glass flask reactor with a magnetic stirrer bar controlled by super magnetic stirrer. Gentle stirring was maintained at ~30 rpm to ensure uniform distribution and heat transfer before temperature was increased to 90° C. The reactor was equipped with bottom heating mantle. After the reactor was heated to the temperature of 90° C., 6.55 g (10%) pre-dissolved Luwax A solution in mineral oil was charged into the reactor and the stirring increased to ~200 rpm. Then the mixture was kept under stirring for about 15 minutes followed by natural cooling.

Example 6

Lithium dispersion in mineral oil, stabilized with the $CO_2$-gas, 22.30 grams, (27.5%) that contained 6.13 g of lithium with medium particle size of 45 microns was charged under constant flow of dry argon at room temperature to a 125 ml glass flask reactor with a magnetic stirrer bar controlled by super magnetic stirrer. Gentle stirring was maintained ~30 rpm to ensure uniform distribution and heat transfer before temperature increased to 90° C. The reactor was equipped with bottom heating mantle. After the reactor was heated to the temperature of 90° C., g pre-dissolved 10% Luwax A solution in mineral oil was charged into the reactor and the stirring increased to ~200 rpm. Then the mixture was kept under stirring for about 15 minutes followed by the natural cooling.

Example 7

5 g of dry stabilized lithium metal powder (LectroMax Powder 150, FMC), 75 g p-xylene (Aldrich) and 0.1 g Luwax A powder (BASF) were charged under constant flow of dry argon at room temperature to a 200 ml three neck glass flask reactor fitted with a stirring shaft connected to a fixed high speed stirrer motor. The reactor was equipped with bottom heating mantles. The reactor was then heated to about 75° C. and gentle stirring was maintained to ensure uniform distribution and heat transfer. The mixture was stirred for 20 minutes at 75° C. and the heating mantle was then removed to allow the sample to cool rapidly. Further, mixture was filtered in an enclosed, sintered glass filter funnel. The sample was dried by passing dry argon through the filter. The resulting free-flowing powder was transferred to a tightly capped storage bottles.

Example 8

Dry stabilized lithium metal powder, 10 g, (LectroMax Powder 150, FMC), 50 g p-xylene (Aldrich) and 0.5 g Luwax A powder (BASF) were charged in an argon filled glove box at room temperature to a 250 ml round bottom flask. The flask was then attached to a rotary vacuum solvent extractor (Buchi Rotavapor R110) and partially submerged in a mineral oil bath at room temperature. The flask was turned while the mineral oil bath was heated to 80° C. The temperature of the mixture was maintained at 80° C. with no vacuum applied for 30 minutes. A vacuum of 25 inches of Hg was then applied to strip the p-xylene. After 50% of the solvent was removed, the flask was raised out of the oil bath and allowed to cool rapidly. The remaining solvent was filtered in an enclosed, sintered glass filter funnel. The sample was dried by passing dry argon through the filter. The resulting free-flowing powder was transferred to a tightly capped storage bottles.

Example 9

4924 g of mineral oil and 1364 g of battery grade lithium metal rods were added to an argon inserted 5 gallon dispersion apparatus. The mixture was heated to temperature above lithium melting point under an argon atmosphere with stirring to ensure that all lithium has melted. The high speed disperser blade was then started and a mixture of 27 g of oleic acid and 29 g of mineral oil was introduced into the dispersion pot. After an additional several minutes of high speed stirring, 18 g of $CO_2$ carbon dioxide gas was introduced. After this, the high speed stirring was brought down to minimum speed and reaction mixture cooled down to 105° C. with external cooling. 136 g of Luwax A powder (BASF) was introduced and the temperature was maintained above 95° C. for the next 15 minutes followed by cooling to ambient temperature. The wax coated SLMP dispersion was then transferred out of the pot. A sample of the dispersion was washed with hexane and pentane to remove the mineral oil. The material was then dried under argon.

Example 10

Dry stabilized lithium metal powder, 10 g, (LectroMax Powder 150, FMC), 50 g p-xylene (Aldrich) and 0.5 g Luwax A powder (BASF) were charged in an argon filled glove box at room temperature to a 250 ml round bottom flask. The flask was then attached to a rotary vacuum solvent extractor (Buchi Rotavapor R110) and partially submerged in a mineral oil bath at room temperature. The flask was turned while the mineral oil bath was heated to 80° C. The temperature of the mixture was maintained at 80° C. with no vacuum applied for 30 minutes. A vacuum of 25 inches of Hg was then applied to strip the p-xylene. As the sample began to dry the vacuum was lowered to 30 inches of Hg to remove the remaining solvent. The flask was removed from the rotary evaporator and the sample was further dried by passing dry argon through the flask. The resulting powder was transferred to a tightly capped storage bottles.

Example 11

Battery grade lithium metal 4427 g and 15345 g of mineral oil were added to a 15 gallon dispersion pot. The mixture was heated to the temperature above the melting point of lithium metal while stirring. Then the high speed disperser blade was set into motion at 4800 rpm and a mixture of 90 gm of oleic acid and 90 g of mineral oil was introduced in to the dispersion pot. After several minutes of high speed dispersion, 58 g of carbon dioxide gas was introduced in to the pot and allowed to react with the metal particles. The high speed disperser was shut off shortly after $CO_2$ addition and cold mineral oil was added to the mix to bring the temperature of the dispersion below the melting point of lithium metal. Anchor agitator was used to continue stirring the dispersion mixture until the material was cooled down to the room temperature to promote uniformity of the suspension. External cooling was applied to the system. The material was discharged and analyzed. The mean diameter of the stabilized lithium dispersion was 52 micron.

Example 12

Battery grade lithium metal 44137 g and 15436 g of mineral oil were added to a 15 gallon dispersion pot. The mixture was heated to the temperature above the melting point of lithium metal under continuous stirring. Then the high speed disperser blade was set into motion at 4800 rpm and a mixture of 89 gm of oleic acid and 87 g of mineral oil was introduced into the dispersion pot. After several minutes of high speed dispersion, 57 g of carbon dioxide gas was charged into the pot and allowed to react with the metal particles. Upon completion of the reaction, 118 g of Luwax S was introduced into the pot. After additional high speed mixing the high speed disperser was shut off and cold mineral oil was added to the mix to bring the temperature below the melting point of lithium metal. Anchor agitator was used to continue stirring the dispersion mixture until the material was cooled down to the room temperature to promote uniformity of the suspension. External cooling was applied to the system. The material was discharged and analyzed. The mean diameter of the stabilized lithium dispersion was 40 micron.

These two examples and figures demonstrate that wax could be used both as a coating reagent and as a dispersant reagent. This is a very important property that could be used in designing products with reduced particle size/increased surface area for specific applications, for example spraying SLMP powder in the solvent solution onto the electrode surfaces or continuously introducing dry SLMP powder into the Tokamak edge using the "gun"-like devices to increase plasma stability and electron temperatures and reduce the impurity levels (lithium is a getter). Table 1 below summarizes specific process conditions and particle size results.

TABLE 1

| Process conditions and experimental results for examples 11 and 12. | | | |
|---|---|---|---|
| Oleic acid, % | Dispersing Speed RPM | Stabilizing Additives | D50 micron |
| Example 11 | 2% | 4800 | 1.25% CO2 | 52 |
| Example 12 | 2% | 4800 | 1.25% CO2 & 2.5% Luwax S | 40 |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. An anode comprising a host material capable of absorbing or desorbing lithium in an electrochemical system and a stabilized lithium metal powder dispersed in the host material, wherein the stabilized lithium metal powder is coated with a wax, wherein the stabilized lithium metal powder has a mean diameter of from 10 μm to 200 μm in N-methyl-2- pyrrolidine or gamma butyrolactone, the wax is a continuous layer and has a thickness of 20 nm to 200 nm.

2. An anode according to claim 1, wherein the wax is selected from the group consisting of natural waxes, synthetic waxes, petroleum waxes, and microcrystalline waxes.

3. An anode according to claim 1, further comprising an inorganic coating.

4. The anode of claim 3, wherein the inorganic coating is selected from the group consisting of $Li_2CO_3$, $LiF$, $Li_3PO_4$, $SiO_2$, $Li_2SO_4$, $LiAlO_2$, $Li_2TiO_3$, and $LiNbO_3$.

5. The anode of claim 1, wherein said host material comprises at least one material selected from the group consisting of carbonaceous materials, silicon, tin, tin oxides, composite tin alloys, transition metal oxides, lithium metal nitrides, graphite, carbon black, and lithium metal oxides.

6. A battery incorporating the anode of claim 1.

* * * * *